United States Patent [19]
Winkelmann et al.

[11] 3,758,553
[45] Sept. 11, 1973

[54] PROCESS FOR THE PREPARATION OF B-FORMYLAMINOPROPIONIC ACID ESTERS

[75] Inventors: Hans Dieter Winkelmann, Opladen; Friedrich Karl Rosendahl, Leverkusen; Harald Oertel, Odenthal-Gloebusch; Heinrich Rinke, Leverkusen, all of Germany

[73] Assignee: Bayer Aktiengesellschaft, Leverkusen, Germany

[22] Filed: Jan. 28, 1971

[21] Appl. No.: 110,747

[30] Foreign Application Priority Data
Feb. 3, 1970   Germany.................. P 20 04 698.4

[52] U.S. Cl. ....... 260/482 R, 260/479 S, 260/482 P
[51] Int. Cl. .......................................... C07c 101/04
[58] Field of Search ..................................... 260/482

[56] References Cited
OTHER PUBLICATIONS
Monatshefte Fur Chemie 78, 137 (1948)

Primary Examiner—Lorraine A. Weinberger
Assistant Examiner—Paul J. Killos
Attorney—Plumley & Tyner

[57] ABSTRACT

This invention relates to a process for the production of β-formylaminopropionic acid esters by reacting formamide with acrylic acid esters in the presence of a basic catalyst at normal pressure and at a relatively low temperature. The β-formylaminopropionic acid esters produced in accordance with the invention are valuable intermediate products for the production of derivatives of β-alanine and for the production of β-alanine itself, both of which are of pharmaceutical interest or may be used as starting materials in the making of polyamides or polyurethanes.

14 Claims, No Drawings

PROCESS FOR THE PREPARATION OF β-FORMYLAMINOPROPIONIC ACID ESTERS

This invention relates to a process for the production of β-formylaminopropionic acid esters by reacting formamide with acrylic acid esters in the presence of a basic catalyst at normal pressure and at a relatively low temperature. The reaction is illustrated by the following equation:

(a) $OHCNH_2 + CH_2 = CHCOOR \xrightarrow{basic\ catalyst}$
$OHCNHCH_2CH_2COOR$ (I)

in which R represents a linear or branched $C_1$–$C_{12}$ alkyl radical, preferably a $C_3$–$C_{12}$-alkyl radical or an araliphatic radical.

The reaction of formamide and acrylic esters has already been described (Monatshefte fuer Chemie 78, [1948] 137). However, it is only carried out as a pressure reaction at considerable outlay in terms of preparation in view of the volatility of the reactants at 170 – 180°C, and in addition gives undesirable secondary products. Thus, the troublesome bis-adduct β,β-formimidodipropionic acid diethyl ester (II) is formed in comparable amounts with the required β-formylaminopropionic acid ethyl ester (I') through the reaction of already formed compound (I') with further acrylic acid ethyl ester in accordance with equation b:

(b) $OHCNHCH_2CH_2COOC_2H_5 + CH_2 =$
$CH-COOC_2H_5 \rightarrow$ (I')

$OHCH-[CH_2CH_2COOC_2H_5]_2$ (II)

It is an object of the present invention to provide a process which avoids the above-mentioned disadvantages and which provides β-formylaminopropionic acid esters (I) in high yields and in a highly pure form, substantially free from impurities in the form of bisadducts and without any need for a pressure reaction.

This object is accomplished by a process for the production of a β-formylaminopropionic acid ester which comprises reacting formamide with an acrylic acid ester in a molar ratio of from 10:1 to 1:10 at normal pressure in the presence of from 0.005 to 10.0 mols of a basic catalyst per mol of acrylic ester and 0.01 to 3.0 percent by weight of a polymerisation inhibitor at a temperature of from 0°C to the reflux temperature of the reaction mixture, and subsequently isolating the β-formylaminopropionic acid ester.

The process is preferably carried out in the presence of tertiary amines as catalysts because in this way hardly any bis-adducts are formed. The starting materials (for example, the formamide, acrylic ester and tertiary amine) are best combined at room temperature, resulting in some cases in the formation of a two-phase reaction solution. However, homogenisation can be obtained by the addition of a solvent. The solution is then heated for several hours. Unreacted and excessive starting materials and the tertiary amines used as catalysts can be separated off by fractional distillation and optionally recycled into the reaction. The required β-formyl-aminopropionic acid ester can be obtained in pure form for example by vacuum distillation. The process is also suitable for continuously carrying out the reaction.

The reaction can also be carried out in the presence of alkali metal hydroxides or alkali metal alcoholates as addition catalysts. These catalysts have a more powerful effect. Accordingly, shorter reaction times and in some cases lower reaction temperatures are required than in the case of the tertiary amines. However, the selectivity of the formamide addition to the acrylic acid ester is somewhat lower and relatively small quantities of bisadducts can be formed at excessively high reaction temperatures.

The quantitative ratios of formamide to acrylic ester can be varied within wide limits, for example from 10:1 to 1:10. It is preferred to use equivalent or excess quantities of form-amide for example in a molar ratio of from 5:1 to 1:1.

Examples of acrylic acid esters suitable for reaction with formamide include acrylic acid alkyl, cycloalkyl, aralkyl and aryl esters, for example methyl acrylate, ethyl acrylate, propyl acrylate, isopropylacrylate, butyl acrylate, isobutyl acrylate, cyclohexyl acrylate, dodecyl acrylate, phenyl acrylate and benzyl acrylate.

Such known compounds as for example hydroquinone, 1-phenyl aminonaphthalene or 2-phenyl aminonaphthalene, can be used in small quantities, for example from 0.01 to 3 percent by weight, as polymerisation inhibitors for the acrylic acid esters.

Tertiary amines and/or alkali-metal alcoholates and-/or alkali metal hydroxides can be used as the basic catalysts. The following compounds for example are suitable: N,N-dimethylcyclohexylamine, N-methylpyrrolidine, tributylamine, tripropylamine, triethylamine, 4-dimethylaminopyridine and 2,3,4,6,7,8,-9,10-octahydropyrimido-[1,2-α]-azepine. Triethylene diamine and the already mentioned azepine have proved to be particularly suitable tertiary amines. The tertiary amines are used in quantities of from 0.05 to 10.0 mols and preferably 0.15 to 1.0 mol per mol of acrylic ester.

Examples of suitable alcoholates include the alkali metal alcoholates, preferably sodium and potassium alcoholates. It is preferred to use the alcohols corresponding to the acrylates for alcoholate formation. They are used in quantities of from 0.005 to 0.25 mols and preferably in quantities of from 0.01 to 0.1 mol per mol of acrylic ester. Na-methylate, K-ethylate, Na-butylate and K-tert.-butylate, for example, are suitable.

Alkali metal hydroxides, especially NaOH or KOH, can also be used in small quantities, for example in quantities of from 0.005 to 0.25 mol per mol of acrylic ester, as basic catalysts for adduct formation.

The solution can be homogenised by the addition of polar solvents such as for example pyridine, dimethyl formamide, dimethyl acetamide, hexamethyl-phosphoric-triamide, N-methyl pyrrolidone or excess tertiary amines.

The reaction is carried out at normal pressure in ordinary reaction vessels equipped with reflux condensers.

The reaction can be carried out at temperatures of from 0°C to a temperature determined by the boiling temperature of the reaction solution (with vigorous reflux and thorough cooling). The reaction temperature can be up to about 210°C (boiling point of formamide), although temperatures of from 50 to 150°C have proved to be particularly effective. In cases where triethylene diamine is used as the catalyst, the reaction is preferably carried out at temperatures of from 60 to 120°C.

The reaction times vary from 3 minutes to 50 hours, and preferably from 3 minutes to 25 hours, reaction times of from 30 minutes to 10 hours being sufficient in most cases.

In cases where alcoholates or alkali metal hydroxides are used, the acrylic ester is added dropwise, preferably over a period of several hours as the reaction progresses, to an optionally heated solution of the alcoholate or alkali metal hydroxide in formamide. In this case, the reaction temperature is in the range of from room temperature to about the boiling temperature of the particular acrylic acid ester. After the reaction components have been added, the mixture can be stirred for a while at optionally elevated temperature. It can then be worked up by fractional distillation. However, it is preferable to neutralise the alkali metal content of the reaction mixture beforehand, for example, by the addition of hydrogen chloride, sulphuric acid, phosphoric acid or acetic acid. Instead of acid, it is also possible to add compounds with active halogen atoms, for example, chloroacetic acid esters and chloroacetic acid amides. Either with or without a neutralisation stage, the reaction mixtures can be poured during working up into water at a low temperature, and the required product is extracted from the aqueous phase with a solvent such as for example chloroform or methylene chloride.

By virtue of the fact that they can be obtained by a simple process from readily available starting materials, the α-formylaminopropionic acid esters produced in accordance with the invention are valuable intermediate products for the production of derivatives of α-alanine and for the production of α-alanine itself, both of which are of pharmaceutical interest or may be used as starting materials in the making of polyamides or polyurethanes. For example, α-alanine ester hydrochloride (and the formic acid ester of the corresponding alcohol which can be separated off by distillation) is obtained in a quantitative yield by reacting a formaminopropionic acid ester with hydrogen chloride in an alcohol. The α-alanine ester hydrochloride can be directly further reacted for example with phosgene to form the corresponding α-isocyanatopropionic acid ester.

The following examples are to further illustrate the invention without limiting it.

Example 1

450 g (10 mols) of formamide and 640 g (5 mols) of acrylic acid n-butyl ester are stirred for 10 hours with 28 g (0.25 mol) of triethylene diamine at a temperature of from 128°C to 134°C. A two-phase system is initially obtained but becomes a homogeneous mixture as the reaction progresses. In the subsequent fractional distillation stage, the β-formylaminopropionic acid n-butyl ester boils at b.p. 115 to 123°C/0.1 Torr ($n_D^{22}$ = 1.4522). Yield: 406 g (65 percent based on the acrylic ester reacted).

The unreacted starting materials separated off in the first runnings can be used for another reaction.

The β-formylaminopropionic acid esters of the general formula

listed in the following Table were prepared in accordance with this example.

| R | Analysis, percent | | | | | | | | $n_{22}^D$ | B.P. |
| | Calculated | | | | Found | | | | | |
| | C | H | N | O | C | H | N | O | | |
|---|---|---|---|---|---|---|---|---|---|---|
| $CH_3$ | 46.8 | 6.9 | 10.7 | 36.6 | 45.7 | 6.8 | 11.0 | 36.2 | 1.4570 | 110–116° C./0.11 torr. |
| $C_2H_5$ | 49.6 | 7.6 | 9.7 | 33.1 | 49.5 | 7.8 | 9.9 | 32.8 | 1.4528 | 95–105° C./0.07–0.08 torr. |
| n-$C_4H_9$ | 55.5 | 8.7 | 8.0 | 27.8 | 55.4 | 8.9 | 8.1 | 27.6 | 1.4522 | 117–123° C./0.08 torr. |
| iso-$C_4H_9$ | 55.5 | 8.7 | 8.0 | 27.8 | 55.3 | 9.1 | 8.3 | 27.6 | 1.4508 | 117–118° C./0.03 torr. |
| n-$C_6H_{13}$ | 59.7 | 9.5 | 7.0 | 23.8 | 59.5 | 9.8 | 7.3 | 23.8 | 1.4568 | 134–140° C./0.06 torr. |
| $CH_2C_6H_5$ | 63.8 | 6.3 | 6.8 | 23.1 | 64.1 | 6.6 | 6.9 | 22.8 | 1.5282 | 198–201° C./0.06 torr. |

Example 2

A two-phase solution of 1,280 g (10 mols) of n-butyl acrylate, 900 g (20 mols) of formamide, 112 g (1 mol) of triethylene diamine and 3.75 g of hydroquinone is heated for 10 hours to between 95 and 100°C. The reaction product is then distilled. The β-formylaminopropionic acid n-butyl ester distils over at b.p. 110–120°C/0.08 Torr. Yield: 900 g (75 percent based on the acrylic ester reacted).

The first runnings consisted of 395 g of acrylic acid n-butyl acrylate, 98 g of triethylene diamine and 597 g of formamide. They can be re-used for another reaction.

Example 3

A solution of 1,280 g (10 mols) of n-butyl acrylate, 900 g (20 mols) of formamide, 112 g (1 mol) of triethylene diamine, 1.28 g of hydroquinone and 1,150 g of dimethyl formamide is kept at 95°C for 6 hours. The solution is then subjected to fractional distillation. The β-formylaminopropionic acid n-butyl ester distils over at b.p. 109–112°C/0.07 Torr. Yield: 195 g.

Example 4

2.88 g (0.125 mol) of sodium are dissolved under nitrogen in 100 ml of methanol. After the excess alcohol has been distilled off, the reaction mixture is heated for another 15 minutes to 180°C. After cooling to 0°C 270 g (6 mols) of formamide are added, as a result of which the sodium methylate is completely dissolved. The product is then re-evacuated briefly at 40°C in a water jet vacuum. The solution is then heated to 75°C and 500 g (5 mols) of ethyl and acrylate are added over a period of 90 minutes during which the temperature should not exceed 95°C. On completion of the addition, the solution is stirred for 30 minutes at 95°C. 1. 3.75 g of glacial acetic acid are added to 350 ml of the above solution. During the subsequent fractional distillation stage, β-formylaminopropionic acid ethyl ester distilled over at b.p. 100–114°C/0.1–0.15 Torr. Yield: 170 g (48 percent based on the acrylic ester used). 2. 350 ml of the above solution were poured into approximately 500 g of ice water. After the solution had been extracted with $HCCl_3$ and dried with $Na_2SO_4$, the product was again subjected to fractional distillation:

a. β-formylaminopropionic acid ethyl ester
b.p. 114–120°C/0.1–0.2 Torr

Yield: 224 g (62 percent based on the acrylic ester used)

b. bis-adduct b.p. 130–147°C/0.1–0.7 Torr

Yield: 42 g (13 % based on the acrylic ester used)

Example 5

45 g (1 mol) of formamide, 7.6 g (0.05 mol) of 2,3,4-,6,7,8,9,10-octahydropyrimido-[1,2-α]azepine and 128 g (1 mol) of butyl acrylate are combined at room temperature to form a two-phase reaction solution which is then heated to 80°C with thorough stirring. After some 30 to 45 minutes, the emulsion has changed into a clear homogeneous solution. The product is then stirred for 1 hour in the absence of heat. To separate the base, the mixture is poured into water. The required product is then extracted with $HCCl_3$ and after drying is subjected to fractional distillation: $b.p._{0.08}$ = 122–127°C. Yield: 86 g (50 percent of the theoretical) based on the compound used.

What we claim is:

1. A process for the production of a β-formylaminopropionic acid ester which comprises reacting formamide with an acrylic acid ester in a molar ratio of from 10 : 1 to 1 : 10 at normal pressure in the presence of from 0.005 to 10.0 mols of a basic catalyst per mol of acrylic ester and 0.01 to 3.0 percent by weight of a polymerisation inhibitor at a temperature of from 0°C to the reflux temperature of the reaction mixture, and subsequently isolating the β-formylaminopropionic acid ester.

2. The process as claimed in claim 1, wherein, on completion of the reaction, excess starting materials are separated off by distillation and the β-formylaminopropionic acid ester product is purified by vacuum distillation.

3. The process as claimed in claim 1, wherein, on completion of the reaction, the reaction mixture is poured into water at a low temperature and the β-formylaminopropionic acid ester product is extracted from the aqueous phase with a solvent.

4. The process as claimed in claim 1, wherein the reaction is carried out continuously, the unreacted and excess starting products which are separated off being recycled to the reaction.

5. The process as claimed in claim 1, wherein formamide is reacted with the acrylic acid ester in a molar ratio of from 5:1 to 1:1.

6. The process as claimed in claim 1, wherein the reaction is carried out in the presence of a solvent.

7. The process as claimed in claim 1, wherein an alkali metal alcoholate is used as the basic catalyst in a quantity of from 0.005 to 0.25 mol per mol of the acrylic acid ester.

8. The process as claimed in claim 1, wherein an alkali metal hydroxide is used as the basic catalyst in a quantity of from 0.005 to 0.25 mol per mol of acrylic acid ester.

9. The process as claimed in claim 1, wherein a compound containing one or more tertiary amino groups is used as the basic catalyst.

10. The process as claimed in claim 9, wherein triethylene diamine is used as the tertiary amine.

11. The process as claimed in claim 9, wherein 2,3,4,-6,7,8,9,10-octahydropyrimido-[1,2-α]-azepine is used as the tertiary amine.

12. β-formylaminopropionic acid alkyl esters of the general formula:

$$HOCNHCH_2CH_2COOR$$

in which R represents a $C_3$–$C_{12}$-alkyl radical.

13. β-formylaminopropionic acid butyl ester.

14. β-formylaminopropionic acid isobutyl ester.

* * * * *